United States Patent [19]

Stowe et al.

[11] Patent Number: 5,121,452
[45] Date of Patent: Jun. 9, 1992

[54] FIBER OPTIC POWER SPLITTER

[75] Inventors: David W. Stowe, Medfield; Michael Corke, Mendon, both of Mass.

[73] Assignee: Aster Corporation, Milford, Mass.

[21] Appl. No.: 532,197

[22] Filed: Jun. 1, 1990

[51] Int. Cl.$^5$ .............................................. G02B 6/26
[52] U.S. Cl. ...................................... 385/46; 385/43; 385/96; 385/48
[58] Field of Search ............... 350/96.15, 96.16, 96.13, 350/96.24, 96.33, 96.2; 65/4.3

[56] References Cited

U.S. PATENT DOCUMENTS

| | | | |
|---|---|---|---|
| 3,554,721 | 1/1971 | Gardner | 350/96.24 |
| 3,579,316 | 5/1971 | Dyott et al. | 65/4 |
| 4,474,431 | 10/1984 | Bricheno | 350/96.15 |
| 4,798,436 | 1/1989 | Mortimore | 350/96.15 |
| 4,923,268 | 5/1990 | Xu | 350/96.15 |
| 4,986,620 | 1/1991 | Severijns et al. | 350/96.15 |

FOREIGN PATENT DOCUMENTS

| | | |
|---|---|---|
| 0013972 | 8/1980 | European Pat. Off. . |
| 0212954 | 3/1987 | European Pat. Off. . |
| 0353870 | 2/1990 | European Pat. Off. . |
| 54-35757 | 3/1979 | Japan . |
| 63-217314 | 9/1988 | Japan . |
| PCT/GB86/00445 | 7/1986 | PCT Int'l Appl. . |
| 8700934 | 2/1987 | PCT Int'l Appl. . |
| PCT/GB90/00419 | 3/1990 | United Kingdom . |

OTHER PUBLICATIONS

Snyder, Allan W., *Journal of the Optical Society of America*, "Coupled-Mode Theory for Optical Fibers", pp. 1267-1277, vol. 62, No. 11, Nov. 1972.

J. D. Minelly et al., *Electronics Letters*, "Single-Mode Fibre Y-Junction Beam-Splitter", pp. 1087-1088, vol. 23, No. 20, Sep. 24, 1987.

D. B. Mortimore et al., *Electronics Letters*, "Low-Loss Joints Between Dissimilar Fibres by Tapering Fusion Splices", pp. 318-319, vol. 22, No. 22, Mar. 13, 1986.

Mortimore, "Theory and Fabrication of 4×4 single-mode fused optical fiber couplers", Applied Optics, vol. 29, No. 3, Jan. 20, 1990, pp. 371-374.

Mortimore, "Wavelength-flattened fused couplers", *Electronic Letters*, vol. 21, No. 17, Aug. 15, 1985.

*Primary Examiner*—John D. Lee
*Assistant Examiner*—John Ngo
*Attorney, Agent, or Firm*—Fish & Richardson

[57] ABSTRACT

Fiber optic power splitters having a central fiber and a selected number of surrounding fibers spaced periodically around the central fiber and the method of fabricating such splitters are described. For splitters having between three and five surrounding fibers, the central fiber is made to have a reduced diameter relative to the surrounding fibers so that it contacts each of the surrounding fibers and each of the surrounding fibers, likewise, touches each of its neighboring fibers. For splitters having seven or more surrounding fibers, the diameters of the surrounding fibers are reduced relative to the central fiber so that mutual contact is made among the set of equal diameter surrounding fibers and the central fiber. The equation governing the relative diameters of the central and surrounding fibers, and methods of obtaining uniform diameter reduction in an optical fiber are described. Single-mode splitters made according to these means have relatively low variation of splitting fraction with variations of input optical power wavelength and can be made to distribute optical power input in any fiber among, e.g. three to seventeen outputs according to predeterminable relationships. Of particular practical importance, splitters can be made which split one input into four, eight, twelve, or sixteen equal outputs, having a flattened response over a significant wavelength range.

10 Claims, 5 Drawing Sheets

FIBER OPTIC POWER SPLITTER

FIELD OF THE INVENTION

The invention relates to fiberoptic splitters or couplers and especially to those which are singlemode and have a broad wavelength response. The invention further relates to fused couplers having more than three fibers fused to form a coupling region.

BACKGROUND OF THE INVENTION

For the purpose of splitting the optical power available on a single fiber into several outputs, fiber optic couplers or splitters have been developed. Among the several types of splitters, some are made by fusing two or more optical fibers together by heating and drawing the fibers while they are held in mutual contact in the fusion region. The result of this method is a tapered region of fused optical material wherein coupling of optical power occurs among the fused fibers in a coupling region within the fused region. Optical fibers used for fabrication of splitters typically have outside cladding diameters of 40 microns (um) or more. While work has been done toward developing splitters made of three or more fused fibers, the most highly developed technology in this field relates to fused splitters composed of two fibers. These are referred to as two-port splitters or 2×2 splitters. The terms splitter and coupler are synonymous.

In order to obtain splitters with four, eight, twelve, sixteen, or more outputs, several two-port splitters have been arranged in a tree-like fashion. In this manner, e.g., a single input may be split into four outputs using three two-port splitters. Using the two-port splitter as a building block in tree structures suffers from several disadvantages including package size, fabrication cost, and long-term reliability.

Fused couplers have been made from seven fibers, wherein six fibers are arranged around a seventh inner fiber. The geometry of circles shows that six identical fibers can be perfectly arrayed around an identical central fiber so that each of the surrounding fibers so disposed will contact both of its neighboring fibers and the central fiber. This is an ideal case from the viewpoint of fused splitter fabrication. The mutual contact among fibers promotes uniform fusion and a resultant relatively high probability that each of the seven outputs can be made to give 1/7th of the output optical power. Such a structure also can be made so that all the optical power input in the central fiber is equally coupled to the six surrounding fibers providing six outputs each giving about 1/6th of the output power.

Splitters using fewer than six surrounding fibers have been very difficult to make. The spacing of the surrounding fibers around the central fiber should be azimuthally periodic in order to obtain uniform outputs. The act of aligning and holding the surrounding fibers prior to and during fusion requires extreme precision. Moreover, the surrounding fibers cannot be held in place by their neighbors as in the seven fiber geometry. On the other hand, by prior methods, there has appeared to be no way to arrange more than seven fibers in a manner that can achieve equal power splitting.

Most distribution system requirements specify splitting in multiples of four. There has been no completely satisfactory means to fabricate a unitary, i.e., single optical structure, splitter that naturally provides four, eight, twelve, or sixteen outputs. The invention addresses that need.

SUMMARY OF THE INVENTION

According to one aspect, the invention is a unitary, singlemode fiber, fused structure composed of four, up to seventeen or more fibers that provides uniform splitting of input optical power among the fibers. Starting e.g. with a set of identical fibers, surrounding fibers and a central fiber are sized prior to fusion so that mutual contact is achieved. "Mutual contact" as used herein means that each surrounding fiber touches the central fiber and both neighboring surrounding fibers. In this construction all of the surrounding fibers have one diameter, and the inner fiber has a different diameter, either larger or smaller than the surrounding fibers, depending on the number of ports to be provided. The ratio of the surrounding fiber diameter r to the central fiber diameter R is given by:

$$r/R = \sin(\pi/N)/(1 - \sin(\pi/N)) \qquad 1.$$

Equation 1 ensures mutual contact among the central and surrounding fibers. Therefore, the surrounding fibers are disposed around the central fiber with an azimuthal periodicity of $2\pi/N$, where N is the number of surrounding fibers. Values of r/R for three to sixteen surrounding fibers are tabulated in Table 1.

TABLE 1

Tabulation of the ratio of surrounding fiber diameter r to central fiber diameter R for N surrounding fibers.

| N | r/R |
|---|-----|
| 3 | 6.46 |
| 4 | 2.41 |
| 5 | 1.43 |
| 7 | 0.77 |
| 8 | 0.62 |
| 9 | 0.52 |
| 10 | 0.45 |
| 11 | 0.39 |
| 12 | 0.35 |
| 13 | 0.32 |
| 14 | 0.29 |
| 15 | 0.26 |
| 16 | 0.24 |

A splitter made from fibers sized according to the ratios given in Table 1 may have either N ports or N+1 ports as will be explained herein. As the fibers are fused and are simultaneously drawn, coupling between the central fiber and each surrounding fiber increases. Optical power input in the central fiber becomes distributed among all the fibers in the structure. The optical power output in the central fiber and any of the surrounding fibers is monitored during the fusion process. The process is stopped when the desired fraction of optical power appears in a surrounding fiber. Light not coupled to the surrounding fibers remains in the central fiber. The term "splitting fraction", as used herein, is defined as the fraction that results by dividing the optical power output in any one output fiber by the total optical power output from the sum of all output fibers. E.g., if there are N output fibers each carrying equal power P, the total output power is N×P, and the splitting fraction is P/(N×P)=1/N. This fraction is synonymously referred to as the coupling ratio. Using seven surrounding fibers, i.e., N=7, a 1×8 splitter results when the optical power in the central fiber equals the optical power in any one of the surrounding fibers. In that case there are N+1 ports each carrying a fraction of 1/(N+1) of the output power.

If the drawing process is continued beyond this point, eventually all of the optical power originally in the central fiber is coupled to the surrounding fibers. For the example above, so doing results in a 1×7 port splitter with each output port carrying 1/7th of the output power. It can be seen that the ratio of output power between any surrounding fiber and the central fiber is arbitrary, depending upon when the drawing is stopped.

In addition to providing a simple means to fabricate couplers having the desired 1×4, 1×8, 1×12, and 1×16 port configurations, it is a further advantage of the invention that the coupling fraction thus obtained is essentially constant over a broader wavelength range than couplers made by fusing fibers that are identical in the region of fusion. For example, two-port fiber optic couplers made by fusing identical fibers have the characteristic that the fraction of optical power coupled from the input fiber to an output fiber depends upon the wavelength of the optical power. Since the wavelengths of optical power most frequently encountered in fiber optic applications occur in narrow wavelength bands clustered around 850, 1300, and 1550 nm, splitters made from identical fibers can be made to operate satisfactorily at only one of those wavelengths. A splitter having a desired splitting fraction at any one wavelength will not necessarily have the same splitting fraction if used at another wavelength. In comparison, couplers made in accordance with the invention are made from fibers having dissimilar diameters in the region of fusion and therefore, dissimilar optical propagation constants. This results in decreasing the wavelength dependence of the splitting fraction to the extent that a coupler of the invention can operate with essentially constant splitting fraction over the wavelength range of 250 nm or more.

The methods of reducing the cross-sectional area of a fiber include etching, machining, and drawing. Combinations of these techniques can also be used. While the features of a splitter of the invention are, in principle, independent of the process used to achieve the reduction, preferred approaches include drawing, etching, or a combination of the two. In practice, a novel drawing method, disclosed herein, significantly simplifies the fabrication process.

Drawing a fiber to reduce the cross-sectional area involves heating a region of the fiber to a suitable working temperature and pulling on one or both ends of the fiber so as to elongate the heated region. There are two distinct variations of this process. In the first, which we shall call "bi-directional drawing", the fiber is elongated simultaneously on either side of the center of the heated region. Bi-directional drawing results in a tapered fiber shape. In the second, called here "uni-directional drawing", the fiber is elongated on only one side of the heated region. A preferred method of uni-directional drawing comprises clamping the fiber at either end in suitable fiber clamps and translating both clamps in the same direction with one clamp moving slower than the other so as to apply tension to the heated region. Using this novel method, a region of fiber within the unbroken continuous extent of the original fiber can be reduced to have an essentially constant reduced diameter over any arbitrary length.

Alternatively, the fibers may be etched prior to fusion. Etching symmetrically removes optical cladding material from the fiber. The core size remains unaffected. In either method, etching or drawing, it is possible to reduce the fibers in the processed region to the degree that the optical fields extend radially beyond the physical extent of the optical material. In principle, therefore, couplers can be made to have a desired coupling ratio when fibers so reduced are brought into contact. Fusion of such a set of fibers results in somewhat increased coupling among the fibers. More commonly, fibers are usually reduced to a degree sufficient to retain the optical fields within the physical extent of the fibers. Then if the fibers are drawn during the fusion step, any desired degree of coupling can be achieved.

According to one aspect, the invention features a fiberoptic splitter comprising a central optical fiber having radius R in a region in which optical coupling is to occur, a set of N surrounding fibers each having radius r in the region, the value of N being greater than 2, the ratio of radii r/R being non-unity and equal to the value: $r/R = \sin(\pi/N)/(1-\sin(\pi/N))$, each of the fibers contacting the central fiber, and each of the surrounding fibers contacting its neighboring two fibers in the surrounding set, the fibers being secured together in their respective regions of contact in a coupling relationship forming an azimuthally periodic optical structure with period $2\pi/N$ radians, the optical structure capable of distributing input optical power among said fibers.

In preferred embodiments, the fibers are single mode fibers and the sets of fibers are fused together in their respective regions of contact forming a unitary fused optical structure.

Preferred embodiments have the following features. The central fiber and the set of surrounding fibers are formed of identical fibers that extend beyond the fused region; the difference between radii r and R of the respective sets of fibers in that region being the result of a uniform reduction in fiber diameter in at least one of the sets prior to fusion.

The splitter is formed of a central fiber that has a uniformly reduced diameter in the contact region and of surrounding fibers that are unreduced in diameter in the region, or the splitter is formed of surrounding fibers that have uniformly reduced diameters in the contact region and of a central fiber that is unreduced in diameter in the region.

The reduction is the result of uniform etching, controlled drawing, or a combination of the two.

In the fused or coupling region the fibers may be confined in a surrounding tube of optical material that uniformly contacts the exterior of the fibers of the surrounding set.

The assemblage of the tube and the sets of fibers are in a fused drawn state defining a tapered unitary fused optical structure, over the length of the fused region the ratio r/R being substantially constant while the values of r and R vary lengthwise with the taper.

The central fiber, surrounding fibers, and tube are typically glass. The tube has refractive index not greater than the refractive index of said surrounding fibers.

Other preferred embodiments have the following features. In the fused or coupling region, the sets of fibers are tapered in a manner retaining the value of r/R substantially constant throughout the optical structure. The optical structure is the result of fusing and drawing.

The splitter has a larger bandwidth of optical frequency response relative to a splitter formed of the same fibers without the reduction in diameter of on of the sets of fibers, preferably the splitter having a splitting ratio that is substantially independent of wavelength over a wavelength range of at least a 250 nm.

In preferred embodiments, the central fiber is constructed to serve as an input port for optical power and each fiber in the surrounding set is constructed to function as an output port, the coupling region having a coupling ratio that provides substantially 1/N of the input power to each fiber of the set of surrounding fibers, or the input fiber also serves as an output fiber, with 1/(N+1) energy being distributed to each fiber.

Number N is selected from a number in the range of 3 to 16 and the ratio r/R has the respective value shown in table given above.

The invention also features the method of forming splitters by observing the rules of construction outlined above.

In the preferred method, a fused singlemode fiber optic splitter is produced having a desired number of output ports, comprising providing an assemblage of a central fiber having a first diameter and a set of surrounding fibers having a set of second diameters in which the number of members in the set of surrounding fibers and their respective diameters are predetermined so that:

a) each of the surrounding fibers contacts the central fiber over the length of a predetermined region;

b) each of the surrounding fibers, over the length of the region, also contacts, on two sides, its neighboring fibers in the surrounding set, and the first diameter of the central fiber is different from at least the diameter of one member of the set of surrounding fibers, and subjecting the region of the assemblage of fibers to thermal fusion in the manner to provide a unitary fused optical structure capable of distributing optical power input on one fiber to other fibers of the structure.

In preferred embodiments of the method the following steps are observed. Prior to fusion, the surrounding fibers all have an identical second diameter, the second diameter in the region being different from the first diameter in the region.

During fusion of the region, the fibers in the region are drawn to provide a coupling region of reduced diameter.

The central fiber and the surrounding fibers may be enclosed before fusion in a tube of optical material. The tube is drawn at the time of fusion of the fibers to form an outer layer of optical material into which each of the surrounding fibers becomes embedded The tube prior to drawing is cylindrical or the tube has a polygonal cross-section with number of sides equal to the number of surrounding fibers, the fibers disposed in the interior vertices of the polygonal cross-section.

For providing a fiber for the assemblage, at least one previously made fiber is uniformly reduced in diameter over a length corresponding to the predetermined region, preferrably by etching or by drawing.

A particularly important feature of the invention is the provision of a fused singlemode fiberoptic splitter wherein at least one of the fibers is constructed to supply input optical power to a unitary fused optical structure, and the unitary fused optical structure is constructed to distribute the input optical power among fibers of the splitter according to at least one predetermined splitting ratio, the predetermined splitting ratio being substantially independent of the wavelength of the optical power within an optical wavelength range of at least 250 nm.

The features and advantages of splitters of the invention and the methods of fabrication will be explained in greater detail in the following description of preferred embodiments and the claims. First we briefly describe the Figures.

a) four equal diameter surrounding fibers arranged around a smaller diameter central fiber before fusion;

b) the fibers of view 1a after fusion;

c) the fibers of view 1a enclosed in a tube of optical material after fusion.

Figure 2A:
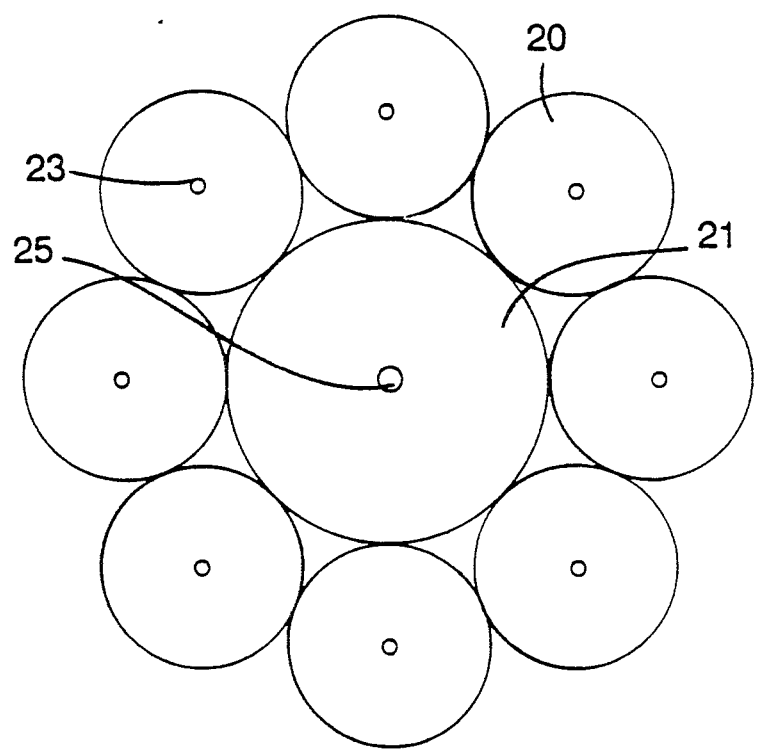
Figure 2B:
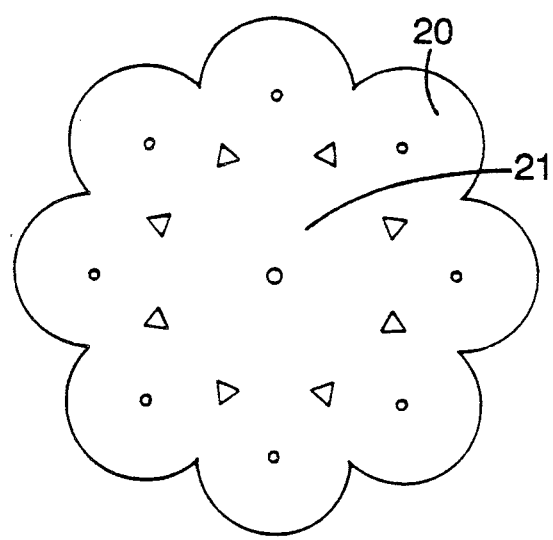

FIGS. 2a and 2b are two cross-sectional views of fibers in progressive stages of splitter fabrication showing, respectively:

a) eight equal diameter surrounding fibers arranged around a larger diameter central fiber before fusion;

b) the fibers of view 2a after fusion.

Figure 3:
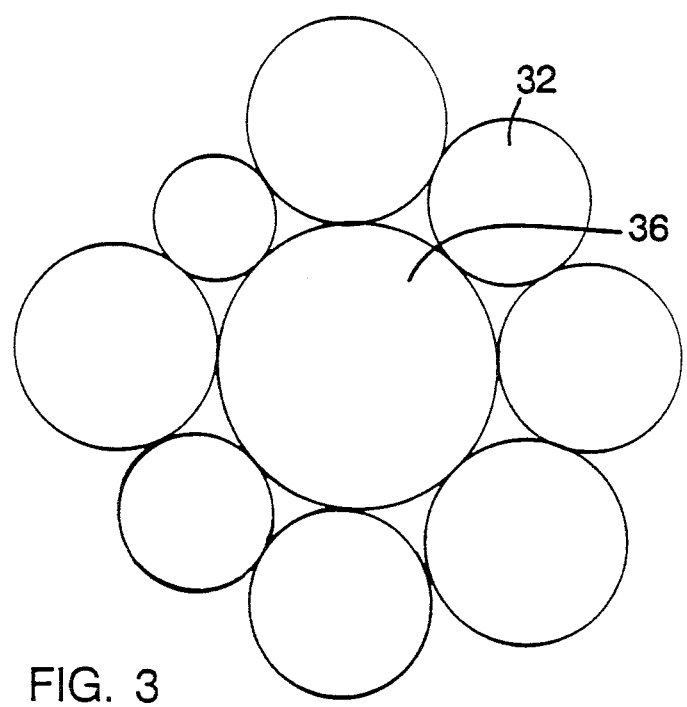

FIG. 3 is a cross-sectional view or eight surrounding fibers of unequal diameter arranged around a central fiber of larger diameter.

Figure 4:
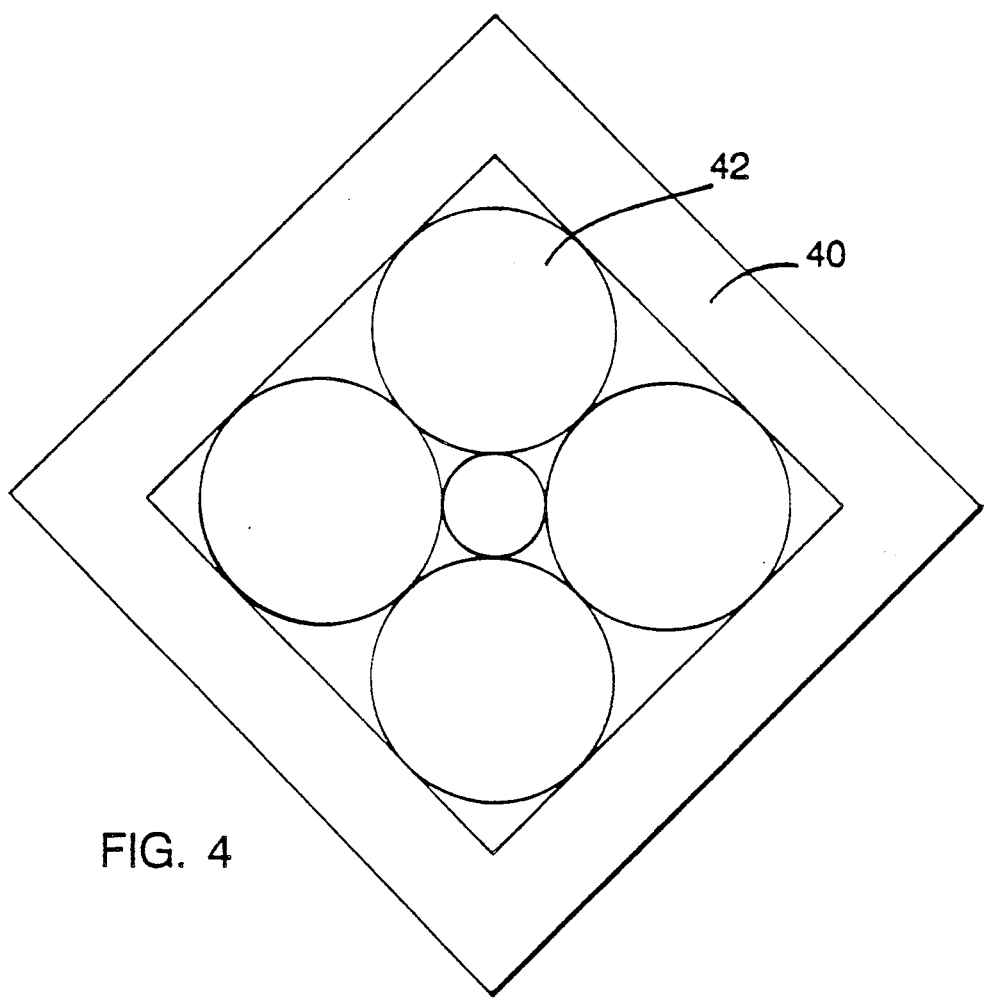
Figure 5:
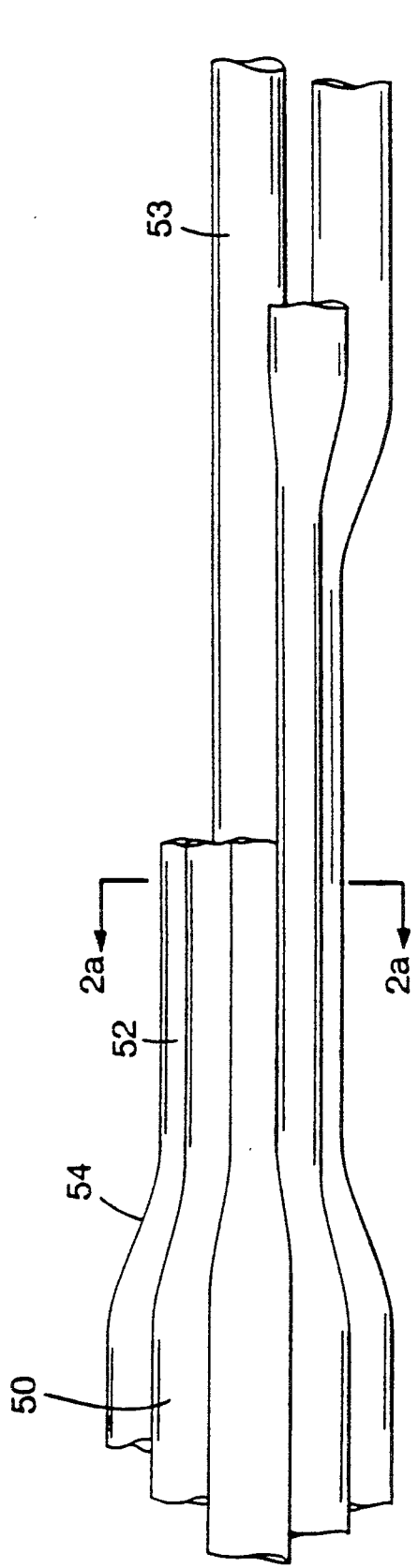

FIG. 4 is a cross-sectional view of four equal diameter surrounding fibers arranged around a smaller diameter central fiber and enclosed in a polygonal tube before fusion. FIG. 5 is a partially cut away side view of eight reduced diameter surrounding fibers arranged around an unreduced diameter central fiber before fusion.

Figure 5A:
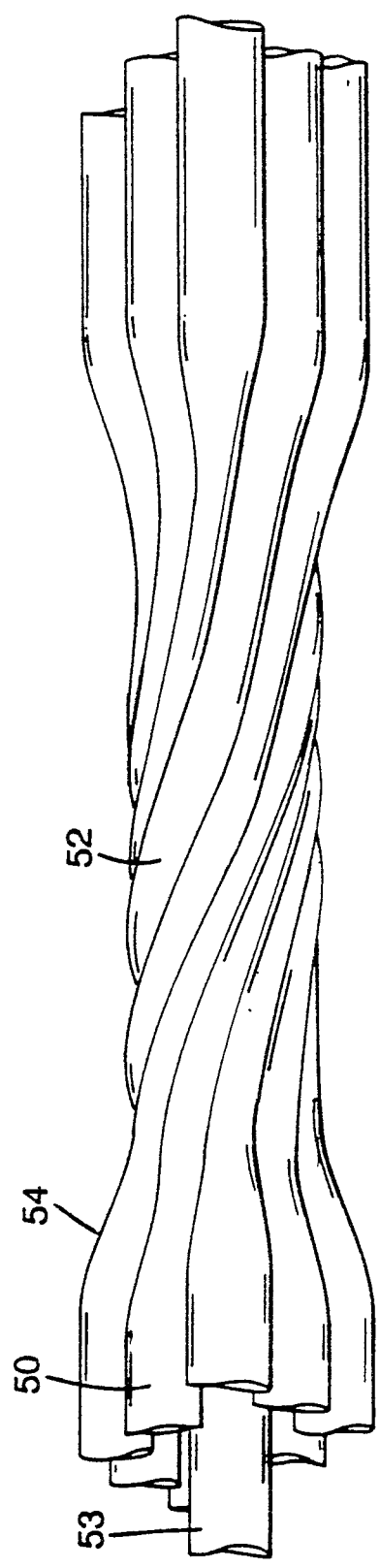

FIG. 5a is a side view of eight reduced diameter surrounding fibers wrapped around an unreduced diameter central fiber before fusion.

FIGS. 6a and 6b are two schematic top views of fixtures used in a method of reducing the diameter of fibers showing a fiber, respective a) before reduction; and b) after reduction.

Figure 7:
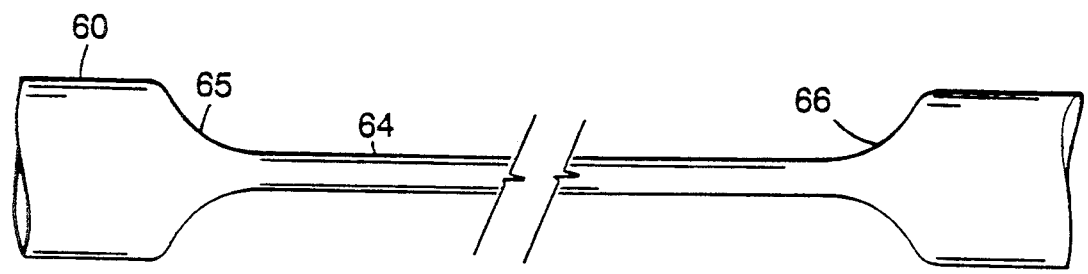

FIG. 7 is an enlarged view of a fiber after diameter reduction using the uni-directional differential speed drawing method.

FIGS. 8a and 8b are two schematic top views of fixtures used to fuse and taper a set of fibers to make a splitter showing, respectively, a) the fibers mounted before tapering; and, b) the fused splitter after tapering.

DESCRIPTION OF PREFERRED EMBODIMENTS

The basic embodiment of the invention involves a central fiber surrounded by a set of three or more mutually contacting surrounding fibers. For fewer than six equal diameter surrounding fibers to be in mutual contact, the central fiber must have a smaller diameter than the surrounding fibers as illustrated in the cross-sectional view shown in FIG. 1a. For more than six equal diameter surrounding fibers, the central fiber must have a diameter greater than the diameter of the surrounding fibers as illustrated in the cross-sectional view shown in FIG. 2a. Equation 1 and Table 1 previously given reveal the diameter ratios required for 3 to 16 surrounding fibers.

On the other hand, the surrounding fibers can have unequal diameters. In that embodiment, shown in FIG. 3, equation 1 no longer holds, and the resulting coupling ratios obtained are generally not uniform. While such embodiments are within the scope of the invention, this discussion shall be limited to the cases illustrated in FIGS. 1 and 2. This is not intended to imply limitation of the scope of the invention to the cases illustrated.

Figure 1A:
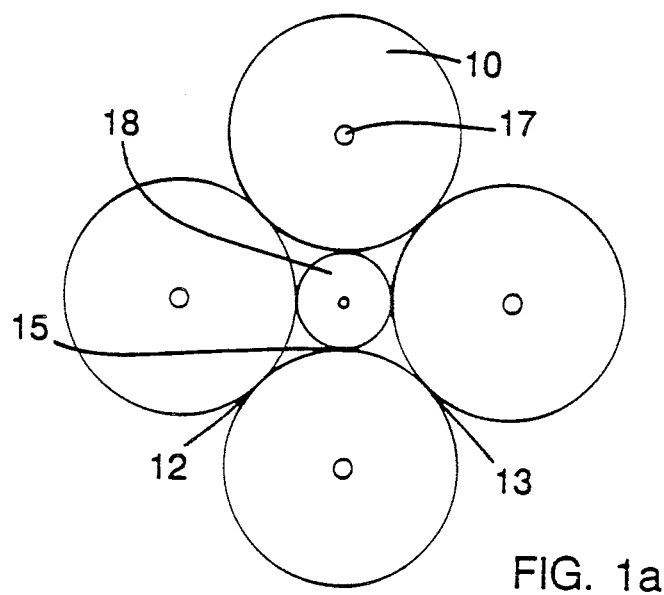
FIGS. 1a–1c are cross-sectional views of fibers showing, respectively.

FIG. 1a illustrates five fibers arranged as they might be before fusion to make a 4 port, i.e., 1×4 or 4×4, or five port, i.e., 1×5 or 5×5 splitter. The four surrounding fibers 10 have diameters each 2.41 times the diameter of the central fiber 18. All the fibers are in contact, i.e., each surrounding fiber contacts each of its two neighbors, e.g., points 12 and 13. Similarly each surrounding fiber contacts the central fiber, e.g., point 15. The cores of each fiber are shown typically at 17.

Figure 1B:
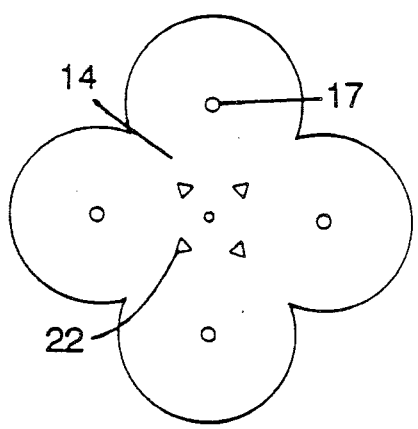

FIG. 1b shows the structure of FIG. 1a as it might appear after fusion. Depending upon the temperature used to fuse the fibers they may coalesce more or less into a solid mass. As illustrated in FIG. 1b, the individual surrounding fibers have become fused in regions typical of 14. In these regions the original boundaries of the original cladding materials are no longer readily distinguishable. The cores 17 retain the same azimuthal periodicity of $2\pi/N$, 90 angular degrees in this case where N = 4 surrounding fibers, but are closer together as required for coupling. The scale of FIGS. 1b and 1c is magnified relative to FIG. 1a.

Figure 1C:
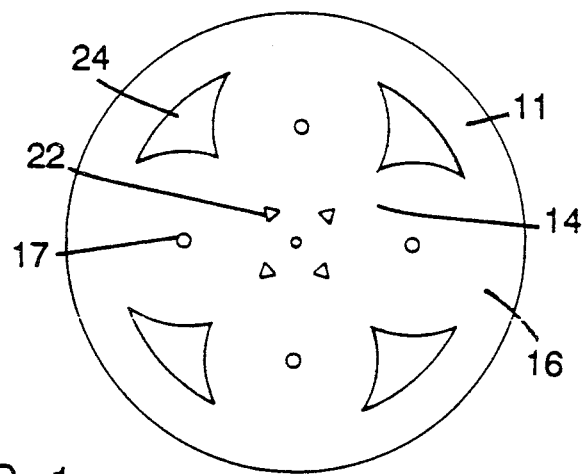

FIG. 1c illustrates the results of an alternative method wherein, prior to fusion, a tube 11 of optical material is placed around the fibers in the region to be fused. In practice it is necessary to first place the surrounding and central fibers inside the tube. When done, the inside diameter of the tube is somewhat larger than the largest outside dimension of the fibers. The diameter of the tube must be reduced by drawing the tube while the fibers are inside. When the inside wall of the tube begins to contact the fibers, the drawing speed is reduced and the amount of heat applied is increased sufficiently to allow drawing of the entire structure.

In this embodiment the cladding material of the fibers fuses into the material of the tube as typical of region 16 as well as coalescing mutually among the fibers 14. The refractive index of the tube material should be somewhat less than the refractive index of the fiber cladding material to avoid optical power loss.

The degree of fusion can be observed by noticing the void regions typical of 22 between the central and surrounding fibers, and 24 between the surrounding fibers and the tube material. Couplers of the invention can be made to have very little fusion of the optical materials. Then the void regions are more pronounced and the fibers appear to retain their individual boundaries. As the degree of fusion is increased the void regions become smaller and the boundaries of the individual fibers tend to disappear. Even though void regions may be present in any embodiment of the invention, the optical materials are considered to be fused into an essentially solid mass which is referred to herein as a unitary optical structure.

FIG. 2a and 2b illustrate a splitter made using eight surrounding fibers and a central fiber. FIG. 2a illustrates the cross-sectional view of the assemblage as it might appear prior to fusion with surrounding fibers typical of 20 disposed around central fiber 21 and all fibers in mutual contact. A feature of this splitter is that the surrounding fibers have smaller diameter than the central fiber. The ratio between diameters of outer to inner fibers r/R is 0.62 as indicated in Table 1. The cores of surrounding fibers as typified by 23, and the core of the central fiber 25 are indicated. FIG. 2b shows the structure of FIG. 2a as it might appear after fusion.

FIG. 3 illustrates a set of surrounding fibers generally indicated by the numeral 32 and a central fiber 36 as the assemblage might appear prior to fusion. Here the surrounding fibers are of differing diameters. After fusion the result appears much as that shown in FIGS. 1b, or 2b except that the radial and azimuthal symmetry present in FIGS. 1a, 1b, 2a, and 2b is not present when the surrounding fibers have different diameters.

In some cases it is desirable to use a polygonal tube instead of a cylindrical tube to surround the set of fibers. In FIG. 4 this is illustrated for a five fiber assemblage. Prior to fusion, as shown in FIG. 4, the surrounding fibers 42 are located in the vertices of the square tube 40 of optical material. The salient features of a polygonal tube embodiment are the same as those discussed previously. The ability to locate the fibers in the inside vertices of the tube prior to fusion has the advantage of increased structural stability before fusion.

FIG. 5 is a side view of an assemblage of fibers prior to fusion schematically illustrating features of the invention not apparent in the cross-sectional views of the previous Figures. Eight surrounding fibers indicated collectively as 50 are shown partially cut away to afford view of the central fiber 53. A cross-sectional view at the section denoted 2a-2a would appear as in FIG. 2a. In this case the central fiber 53 is shown with unreduced diameter, however, the diameter of the central fiber might be reduced e.g., by etching or drawing prior to assembling as shown. Reducing the inner fiber diameter prior to fusion requires a greater percentage reduction of the surrounding fibers in order to retain the required r/R. This leads to a shorter and somewhat more robust structure after fusion. The surrounding fibers are reduced in diameter in the region labelled 52. As illustrated here, the surrounding fibers are shown laying in essentially parallel contact with the central fiber. Alternatively, it is often necessary and desirable to wrap or twist the surrounding fibers in a slight helical manner around the central fiber to obtain stable contact between all fibers prior to fusion. This is illustrated in FIG. 5a.

The surrounding fibers 50 illustrated in FIGS. 5 and 5a are shown with essentially constant reduced diameter throughout the reduced region 52. There is a smoothly tapered region of transition 54 between the region of full diameter surrounding fiber 50 and the reduced region 52. This shape can be achieved by etching the surrounding fibers prior to assembling, by drawing the fibers in a manner to be disclosed herein, or a combination of etching and drawing.

In each embodiment of the invention all fibers may start out identical and then at least one of the fibers is reduced in diameter. One method of providing fibers and reduced in diameter is tapering. The fiber is clamped in right- and left-hand translation stages, heated in the middle, and the stages are caused to move apart in opposite directions away from the heated region thus elongating the heated fiber into a bilaterally tapered structure. Tapered fibers can be used in any of the embodiments of the invention.

Figure 6:
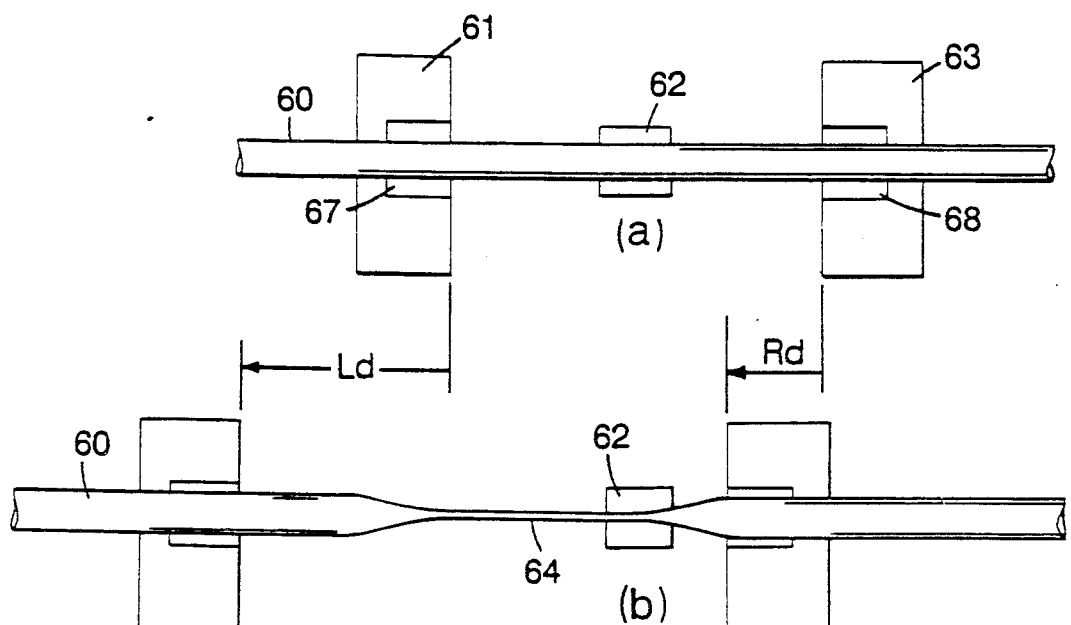

A novel method of drawing has particular importance to the invention. This method is referred to herein as "differential speed uni-directional drawing". Differential speed uni-directional drawing describes the extremely useful technique of moving both translation stages that hold a fiber in the same horizontal direction at different speeds. This is illustrated schematically in FIG. 6. In FIG. 6a the section of the pre-formed fiber to be processed 60 is clamped to a left-side translation stage 61 and to a right-side translation stage 63 using left- and right-side fiber clamps 67 and 68 respectively.

The fiber may for instance be a singlemode telecommunications fiber of 125μm outer diameter or a multimode fiber of 140μm outer diameter, or less. Then one stage, say the left one 61, is made to move a distance indicated by the arrow labeled Ld away from the heated region 62 while the other stage 63 moves a distance indicated by the arrow labeled Rd toward the heated region 62 at a somewhat slower speed. The result of this method is a length of fiber of essentially constant reduced cross-sectional area 64 shown in FIG. 6b. This region of reduced fiber is illustrated in greater detail in FIG. 7. As shown in FIG. 7, the processed region of fiber 60 resulting from the differential speed uni-directional draw discussed in FIG. 6 gradually tapers 65 into a reduced cross-sectional area 64. The reduced cross-sectional area is essentially constant over any desired length of processed fiber. The length of the reduced region is dictated by the amount of horizontal travel available with the translation stages used. A characteristic of fibers thus reduced is that the taper 66 on the side moved toward the heated region is more abrupt than the taper 65 on the side moved away from the heated region. Phenomenologically, the region of constant cross-sectional area 64 results because a steady state is reached wherein fiber material is fed into and extracted from the heated region 62 of FIG. 6 at the same rate. The cross-sectional area required for steady state material flow depends on the difference in speed between the left and right stage when both stages move in the same direction. Therefore, by calibrating the speeds of the stages, relatively long sections of fiber with the same cross-sectional area and shape are produced, and the reduced area can be preselected by choosing a prescribed speed difference.

For example, when steady state flow of optical material is achieved, the following relationship holds:

$$V_t R_t^2 = V_a R_a^2$$

where $V_t$ and $V_a$ represent, the speed of stage motion toward and away from the heated region respectively, and $R_t$ and $R_a$ are the radii of the fiber on the side entering and leaving the heated region respectively. It can be seen, therefore, that if the ratio of translation stage speeds $V_a/V_t = 4$, the ratio of fiber radii $R_t/R_a = 2$. This yields substantially a 50 percent reduction in fiber diameter, i.e., the radius of the fiber leaving the heated region $R_a$ is one half the radius of the fiber entering the heated region $R_t$.

After the fibers are reduced in diameter to the relative sizes given in Table 1, they are assembled in appropriate fixtures to obtain an arrangement like that shown in, e.g., in FIG. 1a and are fused. Fixturing to accomplish this is illustrated schematically in FIG. 8.

Figure 8:
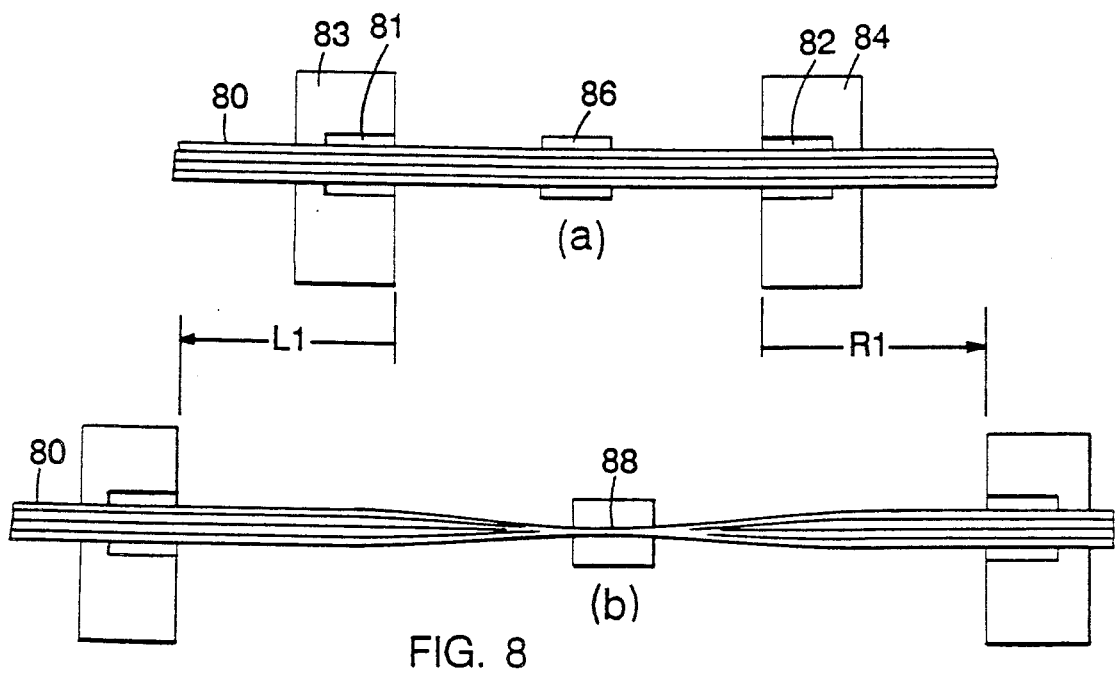

A set of appropriately reduced fibers 80 surrounding a central fiber are clamped by a left-side 81 and a right-side 82 clamp to a left-side 83 and right-side 84 translation stage. A source of heat 86 is located between the stages. Once the fibers are heated sufficiently, the stages are caused to move in opposite directions away from the center of the heated region 88 as shown in FIG. 8b. The arrows in FIG. 8 indicate the amount of translation in the left direction L1 and in the right direction R1. By moving the stages apart at the same rate relative to the center point 88, the fibers are drawn into a symmetrical bilateral taper. The ratio of diameters r/R is essentially constant throughout the tapered fused region while the individual values of r and R vary continuously across the tapered region.

Cross-sections of fibers thus drawn appear essentially as those shown in FIGS. 1b, 1c, or 2b. Any number of surrounding fibers between 3 to 5 and 7 to 16 may be used. The case of six surrounding fibers is excluded because in that unique case all fibers must have the same diameter. The advantage of wavelength flattening which naturally occurs when fibers of different diameters are used is less when fibers of identical diameter are used.

What is claimed is:

1. A fused singlemode fiberoptic splitter comprising
   a) a central optical fiber, representing a set of one, having radius R in a fused region;
   b) a set of N surrounding fibers each having radius r in said fused region, the value of N being greater than 2;
   c) the ratio of said radii r/R being non-unity and equal to the value: $r/R = \sin(\pi/N)/(1 - \sin(\pi/N))$;
   d) each of said fibers contacting said central fiber, and;
   e) each of said surrounding fibers contacting its neighboring two fibers in the surrounding set;
   f) the fibers of said sets being fused together in their respective regions of contact forming a unitary fused, azimuthally periodic optical structure with period $2\pi/N$ radians, said optical structure capable of distributing input optical power among said fibers and
   g) said central fiber and said set of surrounding fibers are formed of identical fibers that extend beyond the fused region; the difference between radii r and R of the respective sets of fibers in said fused region being the result of a uniform reduction in fiber diameter in at least one of said sets prior to fusion.

2. The singlemode splitter of claim 1 formed of a central fiber that has a uniformly reduced diameter in the fused region and of surrounding fibers that are unreduced in diameter in the fused region.

3. The singlemode splitter of claim 1 formed of surrounding fibers that have uniformly reduced diameters in the fused region and of a central fiber that is unreduced in diameter.

4. The singlemode splitter of claim 1, 2, or 3 having a larger bandwidth of optical frequency response relative to a splitter formed of the same fibers without said reduction in diameter.

5. The singlemode splitter of claims 1, 2, or 3 having a splitting ratio that is substantially independent of wavelength over a wavelength range of at least 250 nm.

6. The singlemode splitter of claim 1, 2, or 3 wherein said central fiber is constructed to serve as an input port for optical power and each fiber in said surrounding set is constructed to function as an output port, the coupling region having a coupling ratio that provides substantially 1/N of the output power to each fiber of said set of surrounding fibers.

7. The singlemode splitter of claim 6 wherein N is number selected from a number in the range of 3 to 16.

8. The singlemode splitter of claim 1, 2, or 3 wherein said central fiber is constructed to serve as an input port for optical power and said central fiber and each fiber in said surrounding set is constructed to function as an output port, the coupling region having a coupling ratio that provides 1/N+1) of the output power to each of said output fibers.

9. The singlemode splitter of claim 8 wherein N is selected from a number in the range of 3 to 16.

10. A fused singlemode fiberoptic splitter comprising
a) a central optical fiber, representing a set of one, having radius R in a fused region;
b) a set of N surrounding fibers each having radius r in said fused region, the value of N being greater than 2;
c) the ratio of said radii r/R being non-unity and equal to the value: $r/R = \sin(\pi/N)/(1 - \sin(\pi N))$;
d) each of said fibers contacting said central fiber, and;
e) each of said surrounding fibers contacting its neighboring two fibers in the surrounding set;
f) the fibers of said sets being fused together in their respective regions of contact forming a unitary fused, azimuthally periodic optical structure with period $2\pi/N$ radians, said optical structure capable of distributing input optical power among said fibers and
g) in said fused region said sets of fibers are tapered in a manner retaining the value of r/R substantially constant throughout the fused optical structure.

* * * * *

UNITED STATES PATENT AND TRADEMARK OFFICE
CERTIFICATE OF CORRECTION

PATENT NO. : 5,121,452

DATED : June 9, 1992

INVENTOR(S) : David W. Stowe and Michael Corke

It is certified that error appears in the above-identified patent and that said Letters Patent is hereby corrected as shown below:

On the Title page, item [56], under "References Cited"

Subheading OTHER PUBLICATIONS, add the reference --Gould Advertisement--.

Col. 4, line 67, "on" should be --one--.
Col. 6, line 36, "respective" should be --respectively--.
Col. 10, line 67, "1/N+1)" should be --1/(N+1)--.

Signed and Sealed this

Tenth Day of August, 1993

Attest:

MICHAEL K. KIRK

*Attesting Officer*  *Acting Commissioner of Patents and Trademarks*